May 9, 1933.  R. K. CADWELL ET AL  1,908,317
VEHICLE UNDERCARRIAGE TESTING AND ADJUSTING DEVICE
Filed May 6, 1929  3 Sheets-Sheet 1

Fig. 1.

INVENTORS:
RALPH K. CADWELL,
WILLIAM HOWARD WINHEIM,
BY
Jesse P. Whann
ATTORNEY.

May 9, 1933.  R. K. CADWELL ET AL  1,908,317
VEHICLE UNDERCARRIAGE TESTING AND ADJUSTING DEVICE
Filed May 6, 1929   3 Sheets-Sheet 2
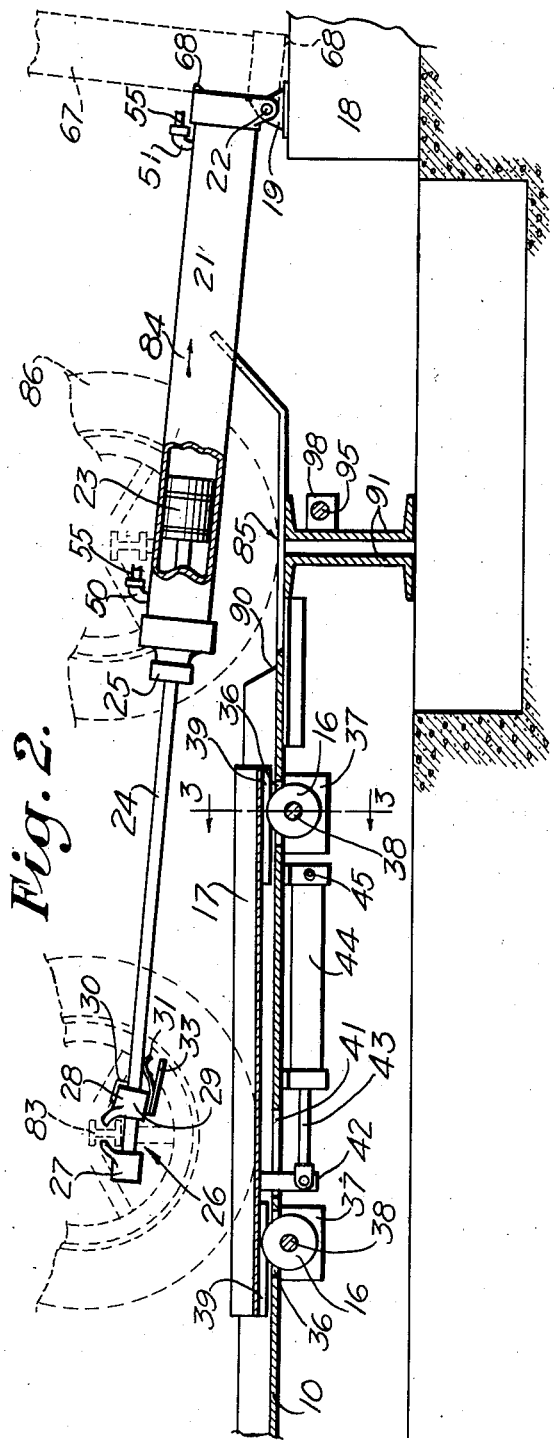
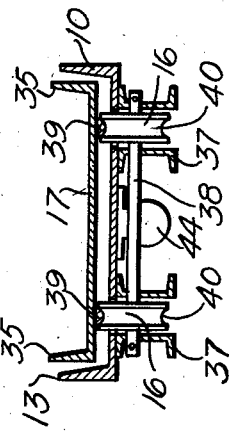
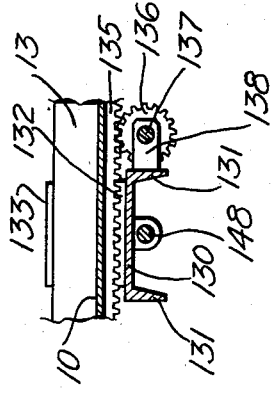
INVENTORS:
RALPH K. CADWELL,
WILLIAM HOWARD WINHEIM,
BY Jesse P. Whann
ATTORNEY.

May 9, 1933.   R. K. CADWELL ET AL   1,908,317
VEHICLE UNDERCARRIAGE TESTING AND ADJUSTING DEVICE
Filed May 6, 1929   3 Sheets-Sheet 3

INVENTORS:
RALPH K. CADWELL,
WILLIAM HOWARD WINHEIM,
BY
Jesse P. Whann
ATTORNEY.

Patented May 9, 1933

1,908,317

UNITED STATES PATENT OFFICE

RALPH K. CADWELL, OF GLENDALE, AND WILLIAM HOWARD WINHEIM, OF LOS ANGELES, CALIFORNIA, ASSIGNORS TO JOHN BEAN MFG. CO., OF SAN JOSE, CALIFORNIA, A CORPORATION OF DELAWARE

VEHICLE UNDERCARRIAGE TESTING AND ADJUSTING DEVICE

Application filed May 6, 1929. Serial No. 360,928.

Two things very essential to the proper operation of motor vehicles are the alignment of the wheels and the proper and balanced operation of the brakes. This present invention relates to a device by which the brakes of a vehicle may be tested so as to enable their proper adjustment and by which the alignment of the wheels and the adjustment thereof may be accomplished.

It is an object of the invention to provide a trackway on which a motor vehicle or other vehicle may be driven and while thereon be tested for disalignment of the wheels and for misadjustment of the brakes.

The device is of such a character that proper adjustments of the wheel alignment and of the braking or retarding capacity of the brakes may be made while in place on the device, and without necessity for removal of the vehicle from the device, thereby making it possible to make the consecutive tests as the adjusting operations are performed.

Further objects of the invention are to provide new and improved means operative on the vehicle supporting structure to test the alignment of the front and back wheels of the vehicle; means for quickly determining the convergence and camber of the front wheels of the vehicle; and associated elements making possible facile operation of the testing and aligning equipment.

Other objects and advantages will be made evident throughout the following parts of the specification.

Referring to the drawings, which are for illustrative purposes only;

Fig. 1 is a plan view of a preferred form of equipment embodying the elements and principles of the invention, the forward standards of the device being sectioned as indicated by the line 1—1 of Fig. 4.

Fig. 2 is an enlarged fragmentary cross-section taken substantially as indicated by the line 2—2 of Fig. 1.

Fig. 3 is a cross-section to slightly enlarged scale on the plane indicated by the line 3—3 of Fig. 2.

Fig. 7 is a fragmentary section as indicated by the line 7—7 of Fig. 1.

Figure 4:
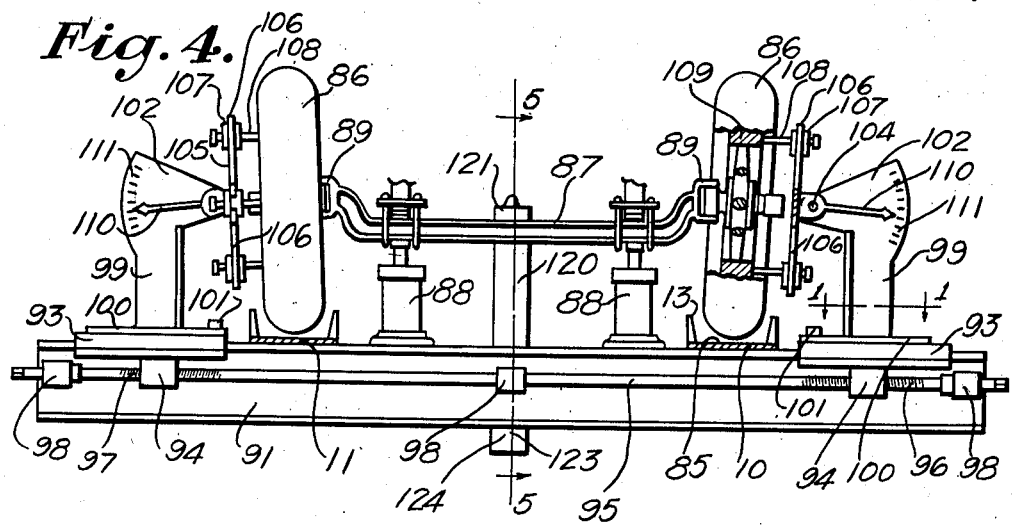
Fig. 4 is a cross-section on the plane indicated by the line 4—4 of Fig. 1, showing the front wheel testing, aligning and adjusting equipment of the device in elevation.

As shown completely in Fig. 1, our undercarriage testing and adjusting device includes a pair of channels 10 and 11 placed parallel in horizontal position with the flanges 13 pointed upwardly. The front ends 15 of the channels 10 and 11 slope downwardly to provide inclines or ramps up which the vehicle to be tested may be driven onto the track members formed by the members 10 and 11, these track members being elevated from the floor so that there is ample room beneath the central portions of the channels 10 and 11 for the accommodation of rollers 16 which support the wheel receiving members 17. The downwardly sloped approaches 15 are at such angle that the vehicle may be readily moved from the floor onto the testing trackways.

On a concrete block 18 or other rigid supporting structure, is an anchor plate 19 to which the cylinder 21 of a puller is hinged as indicated at 22. This cylinder 21 is of double-acting type and is equipped with a piston 23 having a piston rod 24 projecting out through a packing box 25, such piston rod 24 having a clamping device 26 at the outer end thereof consisting of a stationary hooked finger or lip member 27 secured at the extreme end of the rod 24, and an adjustable hooked finger 28 equipped for engagement with a ratchet 28a formed in the upper side of the rod 24 adjacent to the end thereof. As shown in detail in Fig. 1, the member 28 preferably consists of a sleeve portion 29 having an opening therethrough for passage of the rod 24. A pawl or engager 30 is placed at the forward end of the sleeve 29 and a spring 31 is extended from the lower side of the sleeve 29 to the under surface of the rod 24, this spring 31 normally holding the forward end of the sleeve 29 in downward position as shown, thus holding the engager 30 normally in engagement with the ratchet 28a.

To release the engager 30, pressure is brought against the under portion of the sleeve 29, against the action of the spring 31, by an upward pressure of the hand against lever 33, thereby causing the forward end of the sleeve to be swung upwardly out of engagement with the ratchet 28a.

The wheel receiving members 17, of which there are preferably four, consist of channels with their flanges 35 directed upwardly. Under and near the ends of the wheel receiving members 17, openings 36 are formed in the web or plate portions of the channels 10 and 11, and, held in place beneath the openings 36 by means of supporting clips 37 secured to the under faces of the channels 10 and 11, are shafts 38 which carry the rollers 16 in such position that the upper portions thereof project through the openings 36 where they engage and support, in condition for longitudinal movement, the wheel receiving members 17. As a means for interengagement between the wheel receiving members 17 and the rollers 16, are provided ribs 39 on the undersides and near the ends of the wheel receiving members 17, and in the rollers 16 grooves 40 are provided in which the ribs 39 are received, this interengagement serving to guide the wheel receiving members 17 in longitudinal movement. Projecting downwardly from the underside of the wheel receiving members 17, through holes 41 in the webs of the channels 10 and 11, are projections 42 which are pinned to the piston rods 43 forming parts of the four cylinder-piston means including pressure cylinders 44 which are located directly beneath those portions of the channels 10 and 11 lying underneath the members 17. From each of the cylinders 44, as shown in Fig. 1, pipes 45 are directed to pressure gauges 46 located at a convenient point of observation, these pipes and the pressure chambers of the cylinders 44 being filled with oil so that when a forward pressure is exerted against the wheel receiving members 17, the measure of such pressure will be represented by compression of the liquid in the pressure systems, as indicated by the gauges 46 connected therewith.

From the inlet fittings 50 and 51 communicating with the ends of the cylinder 21, pipe members 52 and 53 are carried to a portable, foot operated, control valve 54, the ends 55 of the pipes 52 and 53 being of flexible tubing or hose to provide flexible connection to the cylinder 21, and the ends 56 of the pipe members 52 and 53 are also formed of hose to permit portability of the valve device 54. The valve device 54 has therein valve means for controlling the flow of air to the desired ends of the cylinder 21 to produce a required direction of movement of the piston 23 therein. By moving the valve lever 64 of the valve device into lowered position, fluid under pressure may be caused to flow from the inlet tubing 65, through the pipe member 52 to the rear end of the cylinder 21, with the result that the piston 23 will be impelled in forward direction. By moving the valve lever 63 into down position it is possible to reverse the relationship of the internal valve passages of the member 54, so that the pipe member 53 will be charged and the pipe member 52 discharged, with the result of applying fluid to the forward end of the cylinder 21 to produce a rearward movement of the piston 23 therein, and to permit discharge of fluid from the rear end of the cylinder.

When the brakes of a vehicle are being tested the cylinder 21 occupies the position in which it is shown in full lines in Fig. 1 and 2, but when the alignment of the wheels are being tested or adjusted the piston 21 with its extending rod 24, is swung back into the position shown by the dotted lines 67, there being a stop means such as the projection 68 for supporting the cylinder in backwardly sloped upright position in which it is entirely out of the way of an operator using the wheel alignment testing and adjusting equipment.

By means of pipes 75, inlet fittings 76 are connected with the cylinders 44, for the purpose of co-operating with similar fittings 77 which connect with the upper ends of the oil pressure pipes 45 in filling the pressure systems. In the use of the brake testing elements of the invention, the vehicle is propelled up onto the trackways formed by the channels 10 and 11, and the wheels thereof are brought to rest in the wheel receiving members 17. The attachment means 26 at the forward end of the rod 24 is then caused to engage the front axle 83 as indicated in Fig. 2, or other part of the vehicle as desired, this engagement of the axle 83 being accomplished by bringing the lip member 27 against the axle as shown and then sliding the movable member 28 into position against the other side of the axle, allowing the engager 30 to then engage the ratchet 28a. Owing to the fact that the power cylinder 21 is hinged at 22, it is free to be swung into any position of alignment required by the height or distance of the axle 83, and is permitted to change its angular position relative to horizontal during movement of the axle into position for making a brake test. The control valve device 54 is then placed on the floor of the vehicle in position convenient to a foot of the operator; the brakes of the vehicle are then set and air is fed to the cylinder 21 by pushing down the lever 64, with the result of the piston 23 being moved in the direction of the arrow 84, Fig. 1, so as to exert a forward pull on the vehicle through the interconnecting rod 24. The set brakes will resist rotation of the wheels over the surfaces of their respective wheel receiving members 17 and these wheel receiving members will be shoved forwardly against the resistance of the reacting pressures built up in the pressure cylinders 44, each in proportion to the frictional gripping efficiency of the brake associated therewith. By efficiency of a brake we mean the frictional gripping or retarding capacity thereof.

The relative pressures built up in the several pressure cylinders 44 are indicated by the pressure gauges 46 which are in plain view of the operator, thereby enabling him to note the comparative conditions of the several brakes of the vehicle. After a preliminary adjustment has been made, or at any time desired in the testing operation, the vehicle may be returned to initial or starting position on the wheel receiving members 17 by pushing down on the valve lever 63 of the control device 54, which as previously explained, will cause the feeding of fluid under pressure to the cylinder 21 to move the piston in direction opposite to that indicated by the arrow 84. The valve device 54 enables the testing equipment to be controlled entirely from the vehicle by an operator seated therein so that he may operate brake pedal and lever, and is operated by foot pressure on the actuating levers thereof so as to leave the hands of the operator free. The method of control thus provided, enables the operator to make a complete test of the brakes at various positions of rotation of the wheels, so as to determine if the brake drums are out of round. For instance, the brakes may first be tested with the wheels in the relative positions shown in Fig. 2; the brakes may then be released and the power means allowed to move the vehicle forwardly so that the wheels will roll to an advanced position on the wheel receiving members 17, then after the test of the brakes in this position is made, the wheels may be further advanced so as to make tests in additional positions.

With the vehicle supported on the same track members 10 and 11, the alignment of the wheels may then be tested and adjustment to proper alignment made, by moving the vehicle forward so as to bring the front wheels thereof into the plates 85 as indicated by the dotted lines 86 of Fig. 2 and then employing the equipment which will be next described.

In Fig. 4 we show front wheels 86 and their supporting axle equipment 87 in position on the plates 85, the wheels 86 being slightly lifted by jacks 88 in order to enable movement on the steering knuckles 89. Fig. 2 shows how the flanges 13 of the members 10 and 11 are removed or cut away forwardly from the points 90 to eliminate side obstruction when the wheels are rotated on the knuckles 89. Across the undersides of the plates 85 a bridge structure consisting of a pair of channels 91 is extended, the outwardly projecting ends 92 of these channels 91 supporting front slide plates 93, which, as indicated in Fig. 4, have downwardly extending blocks 94 which make right and left hand engagement with a horizontal shaft 95 having right hand threads 96 and left hand threads 97. The shaft 95 is supported in journal blocks 98 which, as shown in Figs. 2 and 4, extend laterally from one of the channels 91 of the bridge structure. The slide plates 93 are so mounted on the shaft 95 that they will always be equidistant from the longitudinal center-line A of the testing device indicated in Fig. 1. Supported on the slide plates 93 are forward standards 99 having plate portions 100 and being hinged on screws 101 so as to rotate on vertical axes. Plate portions 102 at the upper ends of the standards 99 lie parallel to the crosswise direction of travel of the slide plates 93, and on hinges 104 support spiders 105 having radially extending arms 106 carrying radially adjustable tram blocks 107 from which tram pins 108 inwardly project into engagement with some relatively true annular portion of a wheel 86, such annular portion being preferably the rim or felloe 109, as shown at the rightward side of Fig. 4. It will be recognized that the camber or upward divergence of the wheels may be measured by means of pointers 110 projecting from the spiders 105 across the plates 102, there being graduations 111 on which the pointers 110 indicate the angularity of the respective wheels relative to vertical planes.

Figure 5:
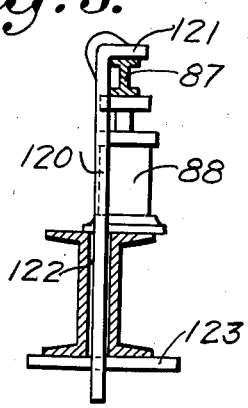
Fig. 5 is a section on the plane represented by the line 5—5 of Fig. 4, further illustrating the front axle adjusting equipment.

The toe-in of the front wheels 86 is measured through the rotation of the standards 99 around the vertical axes represented by the screws 101, there being graduations on the slide plates 93 as indicated at 114 in Fig. 1, traversed by pointer markings 115 on the plates 100 to indicate the toe-in. Bending means are used while the vehicle is in place on the testing device to bend the front axle 87 in order to correct the camber of the wheels. In Fig. 4 are shown powerful jacks 88 which are placed on each side of a centrally placed hook-bar 120 which, as shown in Fig. 5, has a forwardly bent upper end 121 and projects down through the vertical slot 122 formed between the channels 91, there being a bar 123 extended through a hole 124 in the lower portion of the bar 120 to prevent upward movement thereof. By employment of upward pressure with the jacks 88 against the central resistance of the bar 120, the center of the axle 87 may be bent downwardly. By placing a single jack 88 in the center of the axle 87 and using two hook-bars 120, one on each side of the center, the axle may be bent in the opposite direction. Other means may likewise be used to bend the end portions of the axle 87, and it may also be desirable to locally heat the axle by the use of an oxyacetylene flame at the point where the bend is desired.

Referring to Fig. 1, when the vehicle is moved forwardly so as to bring the front wheels thereof in position on the plates 85, the rear wheels will occupy a position on the intermediate parts 126 of the track members 10 and 11 between the front and rear wheel receiving members 17. The exact position of the rear wheels is determined by the wheel-base of the particular vehicle being tested, therefore, in order to check the alignment of the rear wheels we employ a checking means having a cross-member 130 adapted for movement longitudinally with respect to the center line A.

Figure 6:
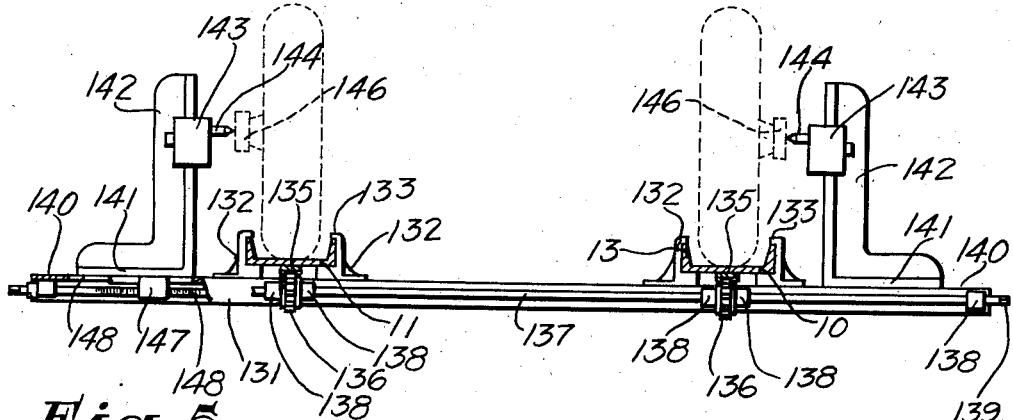
Fig. 6 is a cross-section on the plane represented by the line 6—6 of Fig. 1, showing the rear wheel alignment testing device in elevation.

As shown in Figs. 1, 6 and 7, the cross-member 130 preferably consists of a channel with its flanges 131 directed downwardly. Fixtures 132 are mounted on the upper side of the channel 130, having flange portions 133 which extend inwardly over the upper edges of the flanges 13 of the channels 10 and 11, thereby causing the cross-member 130 to be supported from the channels 10 and 11, but being movably longitudinally thereof. Racks 135 placed so as to extend longitudinally on the undersides of the channels 10 and 11 are engaged by pinions 136 secured on a shaft 137 which extends through journal blocks 138 and has one or both ends thereof prepared as shown at 139 in Fig. 6 to receive a handle by which the shaft may be rotated. On the projecting ends 140 of the cross-member 130 rear slide blocks 141 are placed, these slide blocks 141 having standards 142 therewith which carry vertically adjustable tram members 143 having tram points 144 from which the alignment of the rear wheels may be tested by reference to some portion thereof, such as the hubs 146 indicated in dotted lines in Fig. 6. As shown at the left side of Fig. 6, the members 141 have threaded blocks 147 projecting down through slots 148 in the outer ends 140 of the cross-member 130, these threaded blocks 147 engaging right and left hand threads on a shaft or screw 149 having the ends thereof prepared for engagement of a turning means. The blocks 147 are so positioned on the screw 149 that the standards 142 will be always equi-distant from the longitudinal center-line A of the testing device. The tram points 144 are disposed to move along a lateral center-line B, Fig. 1, at right angles to the longitudinal center-line A, therefore it will be recognized that if the front and rear wheels of the vehicle are properly positioned relative to the longitudinal center-line of the vehicle, the tram points 144 will both just touch the centers of the hubs 146 of the rear wheels when the testing spiders 105 of the front wheel testing equipment centrally engage the front wheels of the vehicle in the prescribed manner.

The tram points, as previously set forth, lie at all times on a line perpendicular to the center line A of the channels 10 and 11; therefore should the chassis of the vehicle being tested be aligned with the channels 10 and 11, and the wheel hubs or axle ends of the rear wheels of the vehicle being tested then fail to coincide with the tram points 174, disalignment of the rear axle structure and wheels will be thereby indicated.

Although we have shown and described a single, simple embodiment of our invention, it is known that certain of the specific elements shown and described, our representative of other parts, devices or mechanism, by which the various functions may be accomplished in substantially the same manner, and it is not intended that our invention shall be limited to the herein disclosure of mechanical parts, but is of such scope as set forth in the following claims.

We claim as our invention:

1. A testing device wheel of the character described, including a supporting frame having a cross member at the forward end thereof; wheel supporting means for supporting the front wheels of a vehicle in position over said cross member; standards extending upwardly from the end portions of said cross member, such standards being movable on said cross member relative to said wheels; alignment testing means carried by said standards adapted for engaging side portions of said wheels; means for supporting the rear wheels of said vehicle when the forward wheels thereof are in position over said cross-member, and means adjustable longitudinally with rspect to said vehicle for testing the alignment of said rear wheels.

2. A testing device wheel of the character described, including: a supporting frame having a cross member at the forward end thereof; wheel supporting means for supporting the front wheels of a vehicle in position over said cross member; standards extending upwardly from the end portions of said cross member, such standards being movable on said cross member relative to said wheels; alignment testing means carried by said standards adapted for engaging side portions of said wheels; means for supporting the rear wheels of said vehicle when the front wheels thereof are in position over said cross-member; a lateral member extending across the rear wheel supporting means, means for moving said lateral member longitudinally with respect to said vehicle; standards extending upwardly from the end portions of said lateral member and being movable on said lateral member; and vertically adjustable means on said standards for engaging the rear wheels in the manner to check the alignment thereof.

3. A testing device of the character described, including: a vehicle supporting structure adapted to receive a vehicle thereon; front wheel testing and aligning means at the front end of said supporting structure; a rear cross-member adapted to be disposed under the rear wheels of said vehicle; means for moving said rear cross-member forwardly and rearwardly relative to said track members; testing elements on the end portions of said rear cross-member; and means for moving said testing elements on said ends of said rear cross-members.

4. A testing device of the character described, including: a vehicle supporting structure adapted to receive a vehicle thereon; front wheel testing and aligning means at the front end of said supporting structure; a rear cross-member adapted to be disposed under the rear portion of said vehicle; means for moving said rear cross-member forwardly and rearwardly relative to said track members; testing elements on the end portions of said rear cross-member; and means operative to move said testing elements simultaneously and in opposite directions through equal distances on the ends of said rear cross-member.

Signed at Glendale, in the county of Los Angeles and State of California, this 22nd day of April, 1929.

WILLIAM HOWARD WINHEIM.

Signed at Chicago in the county of Cook and State of Illinois, this 29th day of April, 1929.

RALPH K. CADWELL.